United States Patent [19]
Canner

[11] Patent Number: 5,282,426
[45] Date of Patent: Feb. 1, 1994

[54] GONDOLA DUMPR WITH LIFT TINES ENGAGING PINS FOR PIVOTING THE GONDOLA

[75] Inventor: Herman M. Canner, Bloomfield Hills, Mich.

[73] Assignee: Sterling-Detroit Company, Detroit, Mich.

[21] Appl. No.: 35,394

[22] Filed: Mar. 22, 1993

[51] Int. Cl.5 .............................................. B61B 3/02
[52] U.S. Cl. ................... 105/261.1; 105/271; 414/414; 414/421; 414/422
[58] Field of Search ............... 104/89; 105/148, 239, 105/247, 261.1, 270, 271; 414/411, 414, 419, 420, 421, 422, 424

[56] References Cited

U.S. PATENT DOCUMENTS

| | | | |
|---|---|---|---|
| 2,692,692 | 10/1954 | Johnson | 414/411 X |
| 3,255,499 | 6/1966 | Crowell et al. | 414/419 X |
| 3,670,912 | 6/1972 | Dunbar | 414/420 |
| 3,881,617 | 5/1975 | Miller et al. | 414/422 |
| 4,095,707 | 6/1978 | Kowtko | 414/421 X |

FOREIGN PATENT DOCUMENTS

| | | | |
|---|---|---|---|
| 2659323 | 1/1978 | Fed. Rep. of Germany | 414/424 |
| 142992 | 7/1980 | Fed. Rep. of Germany | 414/411 |
| 157695 | 1/1957 | Sweden | 414/411 |

Primary Examiner—Robert J. Oberleitner
Assistant Examiner—S. Joseph Morano
Attorney, Agent, or Firm—Barnes, Kisselle, Raisch, Choate, Whittemore & Hulbert

[57] ABSTRACT

A gondola carrying and dumping device with a frame pivotally carrying a sub-frame having a pair of lift forks with tines for carrying a gondola and a slidable cover over the gondola for controlling the dumping of workpieces from within the gondola. A pair of actuators pivotally move the sub-frame and gondola, and a third actuator retracts the cover to control dumping of workpieces from the gondola.

7 Claims, 2 Drawing Sheets

GONDOLA DUMPR WITH LIFT TINES ENGAGING PINS FOR PIVOTING THE GONDOLA

FIELD OF THE INVENTION

This invention relates generally to a gondola container for a bulk or plurality of workpieces and more particularly to a device for releasably lifting, carrying and controllably dumping workpieces from the gondola.

BACKGROUND OF THE INVENTION

Previously, many devices have been used for carrying and dumping open gondolas filled with workpieces. In automated assembly and heat treating operations, dumping in bulk workpieces from gondolas by these devices often damages the workpieces as they are dumped onto a work site. For example, when threaded steel fasteners such as bolts or screws carried in gondolas are dumped in bulk onto a conveyor to be delivered to a heat treating operation to harden the fasteners the fastener threads are frequently damaged. Often times, tilting a gondola to pour out threaded workpieces damages the threads. The inventor has discovered that friction between the moving workpieces tends to interrupt the steady flow of workpieces from the gondola and they tend to pour in intermittent waves, resulting in increased contact of the threads during dumping and increased risk of thread damage.

SUMMARY OF THE INVENTION

A gondola carrying and dumping device of this invention has a sub-frame with pivotally movable tines to releasably carry a gondola and a slidable cover over the gondola. The sub-frame pivots on a carrier frame to dispose the gondola in an inclined position where the cover is partially opened to meter and control the flow of workpieces from the gondola.

Objects, features and advantages of this invention are to provide a gondola carrying and dumping device enabling controlled flow of workpieces from a gondola in a manner essentially eliminating damage to workpieces as they are deposited on a new work site, particularly in operations where metal threaded fasteners are received on a conveyor for feeding into a heat treating operation, and in a manner which is simple, easy to adjust to achieve a desired rate or volume of dumping workpieces, is rugged, durable, reliable, quick and easy to use, and of relatively simple design and economical manufacture.

BRIEF DESCRIPTION OF THE DRAWINGS

These and other objects, features and advantages of this invention will be apparent from the following detailed description, appended claims and accompanying drawings in which:

DETAILED DESCRIPTION

Figure 1:
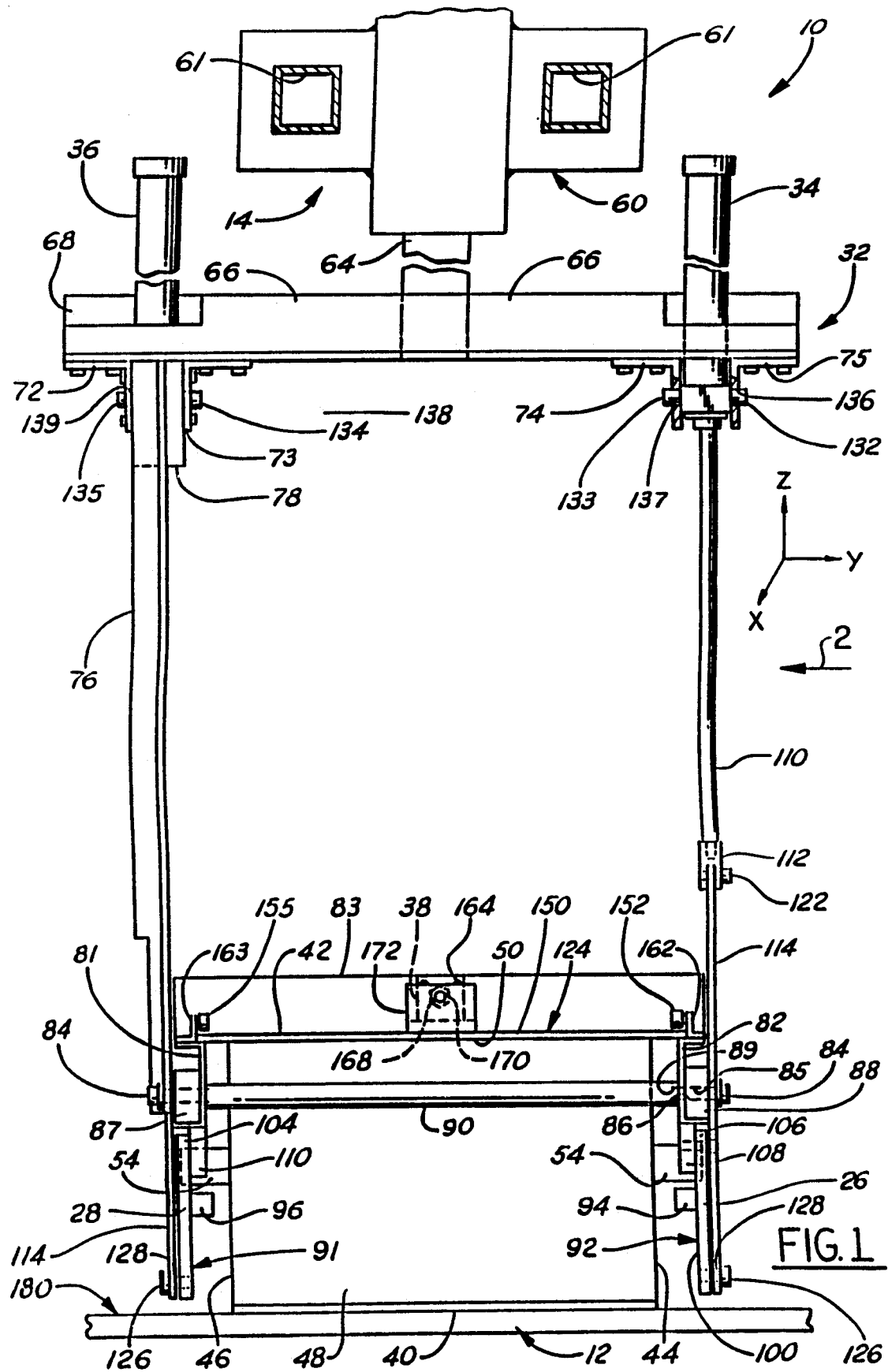
FIG. 1 is a front view of a gondola carrying and dumping device embodying this invention with portions broken away and showing the device positioned to receive and carry a gondola.
Figure 2:
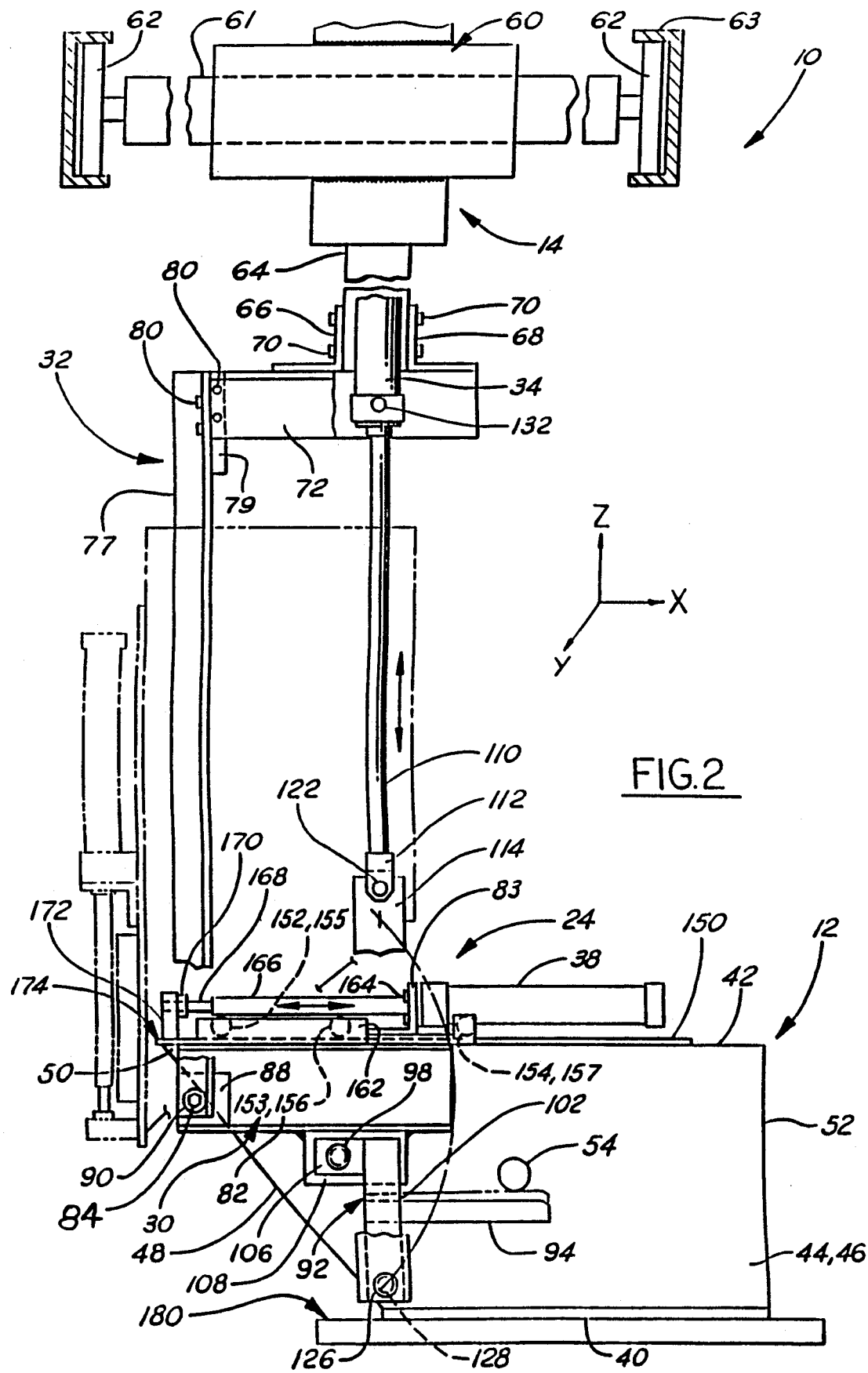
FIG. 2 is a side view in solid line of the gondola and device of FIG. 1 and showing in phantom the gondola carried and rotated to a vertical position.

Referring in more detail to the drawings, FIGS. 1 and 2 illustrate a lift device 10 for carrying a gondola 12 and controllably dumping a bulk of a large number of workpieces such as threaded fasteners or bolts contained therein. The lift device is controllably carried by an overhead conveyor or shuttle 14 to engage and receive any one of several gondolas. A gondola is engaged by the device and releasably trapped between a retractable gondola cover assembly 24 and a pair of lift forks 26 and 28. The cover and forks are carried by a sub-frame 30 suspended from and pivotally carried by a main frame 32 of the device. To facilitate dumping of a gondola, the sub-frame and gondola are rotated by a pair of hydraulic cylinders 34 and 36 and the cover is actuated by a third hydraulic cylinder 38.

The gondola may be of a conventional configuration and construction of sheet metal having a flat bottom 40, an open top 42, a pair of upstanding side walls 44 and 46, an inclined or upwardly sloping front end wall 48 with a lip 50 and an upstanding back end wall 52. A pair of generally opposed lift pins 54 are fixed to the side walls and project outwardly thereof. Preferably, the lift pins are positioned generally in the central region of the side walls so that the gondola when full is substantially balanced so that it could be raised generally vertically by engaging the lift pins 54. Typically this gondola is about 16 inches deep, 25 inches wide and 36 inches long and when full holds about 800 to 1,000 pounds of steel fasteners.

In use, workpieces such as bolts, screws or other threaded fasteners are carried in the open gondola 12 and dumped out through the open top 42 over the lip 50 of the front end by inclining the bottom of the gondola from a horizontal position toward a generally vertical position.

The shuttle 14 moves device 10 along a travel path preferably by selective axial translation along any one or more of three preferably orthogonal axes of motion. The device 10 is moved along a first or X axis in a horizontal plane by moving a conveyor car 60 slidably received on a pair of tracks 61 which are preferably square tubes. The tracks 61 are carried by roller cars 62 adjacent their ends received on rails 63 and movable along a second or Y axis in a horizontal plane and perpendicular to the first axis. A preferably square tube 64 is slidably received in car 60 and carries the device 10 for vertical movement along a third or Z axis perpendicular to the first and second axes. Alternatively, the lift device 10 can be translated and moved through three dimensions by an articulating robotic arm connected to the main frame 32.

The main frame 32 has a pair of angle iron cross members 66 and 68 attached by cap screws 70 to the shuttle arm 64 and fixed adjacent their ends to two pair of transversely extending angle iron stringers 72 and 73 and 74 and 75 by cap screws or welds. The sub-frame 30 is carried by a pair of vertically depending angle iron members 76 and 77 secured at their upper ends to the stringers 72-75 by spacer blocks 78 and 79 and cap screws 80.

The sub-frame 30 has a pair of spaced apart channel iron stringers 81 and 82 fixed by cap screws or welds adjacent the ends of an angle iron cross bar 83. The sub-frame is pivotally mounted on the vertical arms 76 and 77 by cap screws 84 extending through oversize holes 85 in the arms and holes 86 through mounting blocks 87 and 88 fixed to the channel members and threaded into blind holes 89 in a stop bar 90 for retaining the gondola in the sub-frame.

To engage the lift pins 54 of gondola 12, the pair of lift fork assemblies 26 and 28 are pivotally mounted on the sub-frame 30. Each assembly has an L-shape bracket 91 and 92 with a finger or tine 94 and 96 which in use underlies one of the lift pins 54 of the carrier. Each tine is fixed to one leg 100 and 102 of a bracket by welds and extends generally perpendicular to this one leg and parallel to the other leg 104 and 106 of the bracket. Each bracket is pivotally mounted on the sub-frame by a cap screw 98 extending through an oversize hole in the one leg and a hole through a mounting block 108 and 110 fixed by welds to one of the channel members. To limit the extent of counterclockwise (as viewed in FIG. 2) pivotal movement of the lift fork assemblies when no gondola is carried by the device the leg 104 and 106 of each bracket 91 and 92 bears on associated overlying channel iron stringers 81 and 82.

The lift fork assemblies 26 and 28 and the sub-frame 30 are actuated by hydraulic cylinders 34 and 36 each with a piston rod 110 pivotally connected to one of the lift fork assemblies by a clevis 112 and a metal strap or link 114. One end of each link is pivotally connected to the clevis by a pin 122 and the other end of each link is pivotally connected to the leg 100 or 102 of the L bracket 91 or 92 by a cap screw 126 passing through a hole 128 in the link and threaded into the leg adjacent its free end. Each cylinder is pivotally mounted on the main frame by a pair of opposed trunnion pins 132-135 secured to the head of the cylinder and received in co-axial oversize holes 136-139 through the angle iron members of the main frame.

The cover assembly 24 has a flat cover plate 150 mounted for reciprocation on top of the channel members 81 and 82 of the sub-frame 30 by the cooperation of spaced apart retainer rollers 152-157 carried by angle iron guides 162 and 163 fixed to the channel members and between which the side edges of the cover plate are slidably received. The cover 150 is actuated or moved to open and closed positions relative to the front edge 48 of the gondola by the hydraulic cylinder 38 mounted by cap screws 164 on the cross support 83 of the sub-frame. The piston rod 166 of the cylinder is operably connected to the cover plate by a stud 168 and jamb nut 170 threaded into a bracket 172 laterally centered on the cover and fixed by welds to the top of the cover adjacent its leading edge 174. The cover also provides a stop which is engaged by the top of the gondola when the tines 94 and 96 are pivoted to bear on the lift pins 54 of the gondola.

Typically, the carrying device 10 is used in conjunction with a shuttle 14 which positions the device, as shown in FIGS. 1 and 2, for lifting and carrying a gondola 12 received on a support surface 180 such as a table or work bench. Typically, to so position the device, the shuttle moves along three orthogonal first, second and third or X, Y and Z axes. The shuttle may first move the device so that it is generally horizontally aligned with and received on the front portion of the gondola with the tips of the lift tines 94 and 96 spaced horizontally from the lift pins 54. The cylinders 34 and 36 are then energized so that the cover 24 bears on the top of gondola 12 and lift forks 26 and 28 are rotated to drop tines 94 and 96 so that they will clear pins 54 when the device 10 is full advanced into the position over the gondola shown in FIG. 2. Thereafter, the shuttle fully advances the device to the position shown in FIGS. 1 and 2 by moving it horizontally along the first or X axis which is perpendicular to the second and third or Y and Z axes.

As shown in solid lines in FIGS. 1 and 2, this slides and positions the device so that the cover overlies the top of the gondola, the stop bar 90 is disposed under and preferably bears on the inclined forward end 48, and the tines are received under and preferably are somewhat spaced from the lift pins 54 of the gondola 12.

To engage the tines 94 and 96 with the lift pins 54 of the gondola 12 and urge the gondola into firm engagement with both the cover 150 and the stop bar 90, the cylinders are energized to pivotally move the tines into firm engagement with the lift pins of the gondola as shown in phantom in FIG. 2. With the lift forks in this position, if desired, the gondola can be transferred while disposed generally horizontally to another location by actuation of the shuttle to lift and carry away the gondola.

To dispense or pour workpieces from the gondola 12, the cylinders 34 and 36 are energized to pivot the sub-frame and the gondola from the substantially horizontal position, shown in solid line in FIG. 2, counterclockwise toward the vertical position shown in phantom in FIG. 2. When the device has inclined the gondola from its horizontal position, the normally closed cover 150 is moved to at least a partially open position to dispense workpieces from the gondola by energizing the cylinder 38 to retract the cover plate relative to the lip 50 of the inclined end 48 of the gondola to thereby adjust and control the size of the opening through which the workpieces pass when they flow from the gondola. By controlling both the extent of the inclination toward the vertical position of the gondola and the extent of opening of the cover plate 150, the rate at which the workpieces flow by gravity from the gondola can be varied and controlled as desired to sufficiently limit the rate of flow of the workpieces to prevent the threads from being damaged as they pour out of the gondola and are deposited on a receiving surface, such as the moving belt of a conveyor or other means of transporting the workpieces for further processing, inspection, packaging and the like.

Preferably, a mechanical and/or electrical control system may be used to coordinate the rate and extent of inclination of the gondola to the horizontal and opening of the cover 24 by the device 10 to achieve the desired flow rate for pouring or emptying workpieces from the gondola.

After the desired quantity of workpieces have been dispensed from the gondola 12, it can be returned to the horizontal position and the cover plate 150 advanced or closed by energizing the cylinders 34, 36 and 38. If desired, the shuttle 14 can then transfer the gondola to another location and deposit it on a support surface. When received on a support surface, the gondola can be fully released and disengaged from the lift device 10 by energizing the cylinders to pivot tines 94 and 96 to their retracted position where they are spaced from the lift pins 54 of the gondola and then actuating the shuttle to retract the device along the X axis to disengage it from the gondola. The shuttle can then transfer the device to another gondola for lifting, carrying and dumping workpieces from it.

The device 10 uses simple kinematic motions of mechanical elements to quickly and easily engage, carry, pour workpieces from, release and disengage gondolas, especially those used with automated machinery systems and assembly line operations, does not necessarily require special machinery for carrying the device, is adjustable to optimize the rate and quantity of flow of a bulk of workpieces from a gondola through control of the cover position and gondola tilt, and is simply and easily actuated by a pair of co-acting and substantially parallel sub-frame drive cylinders and a cover cylinder.

What is claimed is:

1. A device for carrying a gondola having a bottom, sides, tapered end, open top, and lift pins, pouring out a bulk of workpieces contained therein and comprising:

a frame, a sub-frame pivotally carried by said frame at a first point, a pair of lift forks pivotally carried by said sub-frame to pivot about a second point spaced from said first point, at least one tine carried by each of said lift forks and operable to underlie and abut a respective one of said gondola lift pins when rotated therebeneath, a first actuator operably connected to pivotally move said lift forks and said sub-frame to first and second positions, a cover slidably carried by said sub-frame and movable between a first position wherein the cover overlies at least a portion of the open top of the gondola carried by the sub-frame at least adjacent the tapered end of the gondola and to a second position wherein the cover in cooperation with the gondola defines an opening adjacent the tapered end of the gondola through which workpieces in the gondola pass, a second actuator operably connected to move said cover along the top of the gondola between first and second positions, at least one first stop carried by said sub-frame to bear on the tapered end of the gondola carried by said sub-frame, and at least one second stop carried by said sub-frame to bear on the top of the gondola carried by said sub-frame, said stops and said lift forks being constructed and arranged so that when said first actuator initially moves from its first position toward its second position the tines of said forks are urged into underlying engagement with the lift pins of the gondola so that in cooperation with said stops the gondola is releasably carried in a generally horizontal position by said sub-frame and as said first actuator further moves toward its second position said sub-frame pivots to incline such gondola to such horizontal position, and said second actuator moves said cover relative to said gondola and sub-frame to provide in conjunction with the gondola the opening adjacent the tapered end of the gondola through which workpieces flow from the gondola.

2. The device of claim 1 which comprises a pair of said first actuators each operably connected to one of said lift forks.

3. The device of claim 1 wherein each of said actuators is a fluid actuated cylinder.

4. The device of claim 1 wherein said first actuator comprises a fluid actuated cylinder with a case and a piston rod, said case being pivotally carried by said main frame and said rod being operably pivotally connected with one of said lift forks.

5. The device of claim 1 which also comprises a shuttle for positioning, carrying and manipulating the gondola carrying device.

6. The device of claim 1 which also comprises a shuttle having three orthogonal axes of motion for positioning, carrying and manipulating the gondola carrying device.

7. The device of claim 1 wherein said second actuator comprises a fluid actuated cylinder with a case and a piston rod, said case being carried by said sub-frame and said rod being operably connected with said cover to move said cover to said first and second positions thereof.

* * * * *